Feb. 12, 1946.　　　C. D. JENSEN　　　2,394,550
COATED ELECTRODE
Filed July 15, 1943

INVENTOR
CYRIL D. JENSEN.
BY
ATTORNEY

Patented Feb. 12, 1946

2,394,550

UNITED STATES PATENT OFFICE 2,394,550

COATED ELECTRODE

Cyril D. Jensen, Annapolis, Md.

Application July 15, 1943, Serial No. 494,799

9 Claims. (Cl. 219—8)

(Granted under the act of March 3, 1883, as amended April 30, 1928; 370 O. G. 757)

This invention relates to an improved coated hollow electrode for use in underwater oxy-arc cutting. A principal object of the invention is to provide an electrode for use in underwater cutting having a coating which makes possible continuous maintenance of the arc underwater (a) by burning off at a slower rate than the material forming the electrode core thereby forming a crater which protects the arc from the water and which acts as a spacer to keep the electrode material and the material to be cut in a fixed relationship, and (b) by emitting gases which assist in stabilizing the arc and which aid in driving the water away from the region of the arc. The thickness of the coating is so adjusted that the operator maintains the correct arc length by holding the tip of the electrode slightly inside the cut and on the lip of the advancing cut.

Another object is to provide a coating which is substantially a dielectric or electrical insulator. This feature prevents the flow of stray currents between the sides of the electrode and the material to be cut and prevents arcing when the electrode is pressed against the edge of the advancing cut in the material.

A further object is to provide a coated electrode for underwater cutting in which the water is not appreciably discolored by the combustion products of the coating as the latter burns off.

Still another object is to provide an electrode coating which is waterproof thereby preventing the coating from disintegrating.

These and other objects of my invention will become apparent from the following detailed description and from the accompanying drawing.

Figure 1:
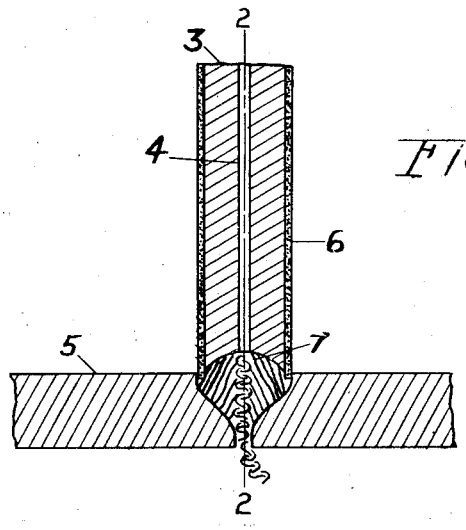
Fig. 1 is an end view illustrating the coated electrode in operation.
Figure 2:
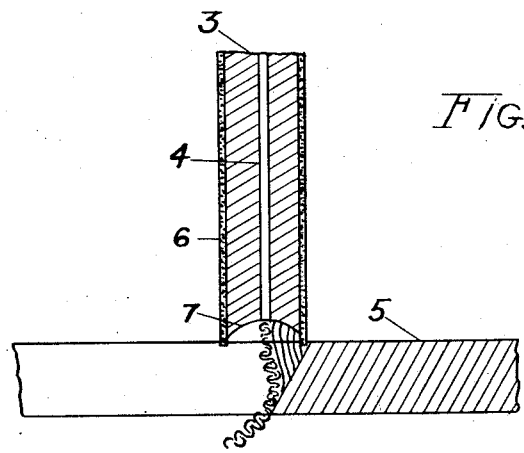
Fig. 2 is a side view taken along lines 2—2 of Fig. 1.

Referring now to the drawing, there is shown an electrode 3 which is made of iron or steel. The electrode has a bore 4 extending therethrough for the purpose of conveying oxygen to the cutting area of the material 5 which is to be cut.

A coating 6 which is waterproof and a dielectric is provided on the electrode 3 and its composition is such as to burn off at a slower rate than the electrode material. A crater 7 is thus formed adjacent the cutting area.

The ratio in burn-off rates of the electrode 3 and coating 6 is such that an arc of the correct length is always maintained. From this it will be evident that but little skill and training is required to develop a good cutting technique since the operator needs only to place the end of the electrode in contact with the material to be cut and move it in the direction of the desired cut.

Prior to my invention, however, much skill had to be developed in order to maintain the proper distance between the end of the electrode and the work for obtaining a proper arc. Also since the electrode was spaced from the work, the desired line of cut was more difficult to follow.

Furthermore, with my improved crater-forming electrode, the arc is substantially confined within the crater. Only a little, if any, of the arc is visible from the side of the work and this feature enables the operator to more accurately follow the desired line of cut along the work.

A preferred composition of the coating consists of 6 parts Ucilon lacquer by volume to 4 parts of lime filler. Ucilon, a trade name, is a polyvinyl chloride in lacquer form. It consists of 28% resin by weight and 72% solvent, the resin containing about 40.8% chlorine. The solvent may be a mixture of amyl alcohols having a distillation range of 180°–320° F., 70% of which is distilled at 240°–250° F.

I have found, however, that the above proportions of ingredients are not critical and that a ratio of 5 parts of lacquer to 5 parts of lime works satisfactorily. Also a ratio of 7 parts of lacquer to 3 parts of lime filler give good results.

I have further discovered that other coating compositions substituting other materials give good performance. These are as follows: (by volume)

| | Parts |
|---|---|
| Ucilon lacquer | 2 |
| Talc | 1 |
| Wood flour | 1 |
| Ucilon lacquer | 2 |
| Lime | 1 |
| Wood flour | 1 |
| Ucilon lacquer | 3 |
| Iron oxide | 2 |
| Ucilon lacquer | 3 |
| Barium carbonate | 2 |
| Ucilon lacquer | 5 |
| Wood flour | 3 |

If desired the Ucilon lacquer in each of the foregoing coating compositions may be replaced by some other similar resin base binder. For example, Koroseal and Sea-Lac may be used in place of the Ucilon lacquer. Koroseal, a trade name, consists of a polyvinyl chloride plasticized with tricresyl phosphate. Sea-Lac, a trade name, consists of a polyvinyl chloride similar to Ucilon but dissolved in a less toxic group of solvents.

In the above listed coating compositions, the lime, talc, barium carbonate and iron oxide serve to slow the melting rate of the electrode 3 and stabilize the arc at the electrode tip.

The wood or cellulose flour is vaporized by the heat of the arc and the gas emitted serves to drive the water away from the arc path.

Application of coating

In preparing any of the foregoing coatings, all the materials comprising it are thoroughly mixed to form a smooth batter. The electrodes if coated by the dipping process may be suspended in racks with about ¼" between each electrode. The rack of electrodes is then placed inside the coils of an induction heater and brought up to a temperature of about 150° F. Thereupon the rack of electrodes is dipped into the batter and withdrawn slowly. The heat contained in the electrodes causes the coating to dry rapidly and has the added merit of aiding in the formation of a thicker coat with each dip as the dipping operation is repeated until a proper thickness of coating has been obtained.

In the dipping process, the lower end of the tubular electrode should be plugged. This may be done by dipping the electrode for the first time to a depth of only about ¼". When the rack of electrodes is hung up to dry, a drop forms at the bottom which soon hardens and effectively plugs the bore.

The electrodes should not be dipped to their full length, it being desirable that about 1½" should be left uncoated to fit the electrode into the torch body.

After this dipping process is completed, and the electrodes thoroughly dried they must be trimmed and unplugged.

They are then ready for service.

Thickness of coating

The proper thickness of coating may best be ascertained by the performance under test of a few electrodes having various coating thicknesses. The test involves the "drag" technique for using the electrodes in an oxy-arc torch and may be described as follows:

With the electrode poised in position near the point of the beginning of the desired cut, the oxygen valve is opened allowing oxygen to pass downwardly through the bore 4 in the electrode 3 and the arc struck immediately afterwards. The arc is held for a moment and then the electrode is brought into contact with the work 5. The electrode 3 is pushed into the cut a short distance, up to ⅛", and at the same time pressed in the direction of progression of the cut at the rate the base metal is being consumed. If an electrode responds well to the employment of the above technique, the coating thickness may be considered proper.

For example, with a steel tubing .3125" in outside diameter and a bore of .11", the coating would be applied until the outside diameter was very close to .375".

I have also found that none of the foregoing coating compositions discolor the water appreciably. This is an additional advantage in that the operator is always readily able to see the material at the desired line of cut.

In conclusion, while I have specifically described certain preferred embodiments of my invention, the invention is not so limited but may be otherwise embodied and practiced with the scope of the appended claims.

The invention described herein may be manufactured and used by or for the Government of the United States of America for governmental purposes without the payment of any royalties thereon or therefor.

I claim:

1. A tubular ferrous electrode for underwater cutting having a coating applied thereto, said coating comprising, by volume, from 5 to 7 parts of resin base material in lacquer form which is fundamentally a polyvinyl chloride and from 3 to 5 parts of arc stabilizing material from the group including lime, talc, barium carbonate, and iron oxide, the thickness of said coating being such as to effect a burning rate thereof which is less than the burning rate of said electrode.

2. A tubular ferrous electrode for underwater cutting having a coating applied thereto, said coating comprising, by volume, 2 parts of resin base material in lacquer form which is fundamentally a polyvinyl chloride, 1 part of arc stabilizing material from the group including lime, talc, barium carbonate and iron oxide, and 1 part of cellulose flour, the thickness of the coating being such as to effect a burning rate thereof which is less than the burning rate of said electrode.

3. A tubular ferrous electrode for underwater cutting having a coating applied thereto, said coating comprising, by volume, from 5 to 7 parts of resin base material in lacquer form which is fundamentally a polyvinyl chloride and from 3 to 5 parts of lime filler, the thickness of said coating being such as to effect a burning rate thereof which is less than the burning rate of said tubular electrode.

4. A tubular ferrous electrode for underwater cutting having a coating applied thereto containing the following as principal ingredients:

| | Parts by volume |
|---|---|
| Polyvinyl chloride in lacquer form | 6 |
| Lime filler | 4 |

5. A tubular ferrous electrode for underwater cutting having a coating applied thereto containing the following as principal ingredients:

| | Parts by volume |
|---|---|
| Polyvinyl chloride in lacquer form | 5 |
| Lime filler | 5 |

6. A tubular ferrous electrode for underwater cutting having a coating applied thereto containing the following as principal ingredients:

| | Parts by volume |
|---|---|
| Polyvinyl chloride in lacquer form | 7 |
| Lime filler | 3 |

7. A tubular ferrous electrode for underwater cutting having a coating applied thereto containing the following as principal ingredients:

| | Parts by volume |
|---|---|
| Polyvinyl chloride in lacquer form | 2 |
| Talc | 1 |
| Wood flour | 1 |

8. A tubular ferrous electrode for underwater cutting having a coating applied thereto containing the following as principal ingredients:

| | Parts by volume |
|---|---|
| Polyvinyl chloride in lacquer form | 2 |
| Lime | 1 |
| Wood flour | 1 |

9. A tubular ferrous electrode for underwater cutting having a coating applied thereto containing the following as principal ingredients:

| | Parts by volume |
|---|---|
| Polyvinyl chloride in lacquer form | 3 |
| Iron oxide | 2 |

CYRIL D. JENSEN.